US008949778B2

(12) United States Patent
Hagerty

(10) Patent No.: US 8,949,778 B2
(45) Date of Patent: *Feb. 3, 2015

(54) METHOD AND COMPUTER PROGRAM PRODUCT FOR CREATING A QUESTIONNAIRE INTERFACE PROGRAM

(71) Applicant: GCC Innovative Technologies, LLC, Cape Canaveral, FL (US)

(72) Inventor: Timothy Hagerty, Cocoa Beach, FL (US)

(73) Assignee: GCC Innovative Technologies, LLC, Cape Canaveral, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,275

(22) Filed: Mar. 3, 2014

(65) Prior Publication Data

US 2014/0181785 A1 Jun. 26, 2014

Related U.S. Application Data

(63) Continuation of application No. 13/289,064, filed on Nov. 4, 2011, now Pat. No. 8,707,253.

(60) Provisional application No. 61/410,413, filed on Nov. 5, 2010.

(51) Int. Cl.
*G06F 9/44* (2006.01)
*G06F 17/30* (2006.01)
(52) U.S. Cl.
CPC .. *G06F 8/20* (2013.01); *G06F 8/30* (2013.01); *G06F 17/30398* (2013.01)
USPC .......................................................... 717/106

(58) Field of Classification Search
CPC ............... G06F 8/20; G06F 8/30; G06F 8/36; G06F 17/30398
USPC .......................................... 717/106, 139, 140
See application file for complete search history.

(56) References Cited

U.S. PATENT DOCUMENTS

| 6,189,029 | B1 | 2/2001 | Fuerst |
| 7,337,159 | B2 | 2/2008 | Tapio et al. |
| 8,429,026 | B1 | 4/2013 | Kolawa et al. |
| 8,515,847 | B2 * | 8/2013 | Schultz ........................... 705/35 |
| 8,707,253 | B2 | 4/2014 | Hagerty |
| 8,712,824 | B1 * | 4/2014 | Julian et al. ................... 705/7.32 |
| 2001/0037451 | A1 * | 11/2001 | Bhagavatula et al. ........ 713/155 |
| 2002/0085030 | A1 | 7/2002 | Ghani |
| 2007/0067827 | A1 * | 3/2007 | Bhagavatula et al. ............ 726/2 |
| 2008/0213020 | A1 | 9/2008 | Kunzel |
| 2009/0037452 | A1 | 2/2009 | Baitalmal et al. |
| 2009/0276839 | A1 * | 11/2009 | Peneder ............................ 726/8 |
| 2013/0124401 | A1 | 5/2013 | Del Real |

* cited by examiner

*Primary Examiner* — Anna Deng
(74) *Attorney, Agent, or Firm* — Mark R. Malek; William A. Harding; Widerman Malek, PL

(57) ABSTRACT

A computer program including an interface that may be used by a content designer to manipulate information stored in the database. The content designer may design one or more questionnaire pages, to be included in a questionnaire site, which may be built into a questionnaire interface program by a compiler. The resulting questionnaire interface site may be accessed and manipulated by a client user to respond to the questions included therein. Validation responses may be defined by a content designer, against which responses by a client user may be compared. The various elements included herein may be connected through a network, which may be accessed through a user interface terminal.

21 Claims, 11 Drawing Sheets

METHOD AND COMPUTER PROGRAM PRODUCT FOR CREATING A QUESTIONNAIRE INTERFACE PROGRAM

RELATED APPLICATIONS

This application is a continuation and claims the benefit under 35 U.S.C. §120 of pending U.S. patent application Ser. No. 13/289,064, titled Method And Computer Program Product For Creating A Questionnaire Interface Program, filed Nov. 4, 2011, by the inventor of the present application which, in turn, claims the benefit under 35 U.S.C. §119(e) of U.S. Provisional Patent Application Ser. No. 61/410,413 titled Method And Computer Program Product For Creating Questionnaire Interface Programs filed by the inventor of the present application on Nov. 5, 2010, the entire contents of each of which are incorporated herein by reference.

FIELD OF THE INVENTION

The present invention relates to the field of program generation and data management and, more specifically, to methods and a computer program product for creating questionnaire interface programs.

BACKGROUND OF THE INVENTION

Ever since the introduction of programmable computer systems, data has been collected and stored in digital volumes. As computers continually increase in processing power and storage capability, the task of collecting and analyzing data is increasingly becoming an automated function performed by computing machines.

Businesses are increasingly able to record and store critical performance measures, such as inventory levels for individual products, contents of a particular customer's purchase order, sales trends for items over a particular season or other calendar period, experimental result sets, logistics pathways, or delivery and maintenance schedules. Consumers are able to build repositories of digital content, including all forms of media and personal documents, as well as create catalogs for physical items, such as books in a library.

Likewise, through the advent of highly scalable server arrays and more robust broadband infrastructures, many computing tasks have been offset to remote server banks commonly known as "the cloud." Tasks traditionally performed on isolated terminals are now capable of centralization, allowing one cluster of computer servers to perform the complicated processing, compiling, and data management services once performed on isolated computers and intranets.

The cloud has further allowed the interconnection of multiple computer networks into one cohesive array of electronic devices communicating with one another. As a result, user terminals may now operate as data input devices, transmitting the information received to a centralized storage center. The centrally stored data is then available for further processing and analysis by other remotely located systems or administrators.

The flexibility provided by server based data collection and processing traditionally comes at the expense of simplicity. Often, the only solution is to employ one or more persons with advanced software development skills that can assemble a customized interface for use in collecting, viewing, and maintaining content. For individuals, this solution may be far too expensive. For small businesses, which may not be able to justify having fulltime IT staff, this solution may be equally prohibitive. Contract or short-term help, such as consultants, may be utilized to build appropriate task specific applications or data management system, but long-term supportability may represent hidden costs, especially in situations where the created system is damaged or destroyed, for example, through hardware failure or viral infection. Some companies attempt to provide a solution by hosting a content management system that is accessible using an Internet connection. However, with those types of solutions, content designers may not be permitted to customize or modify their applications and data storage structures as they are not likely given sufficient access to the code project for making such changes. Additionally, many hosted solutions require a company to host their web applications on a specific server, which must generally be paid for on a periodic basis (e.g., monthly). Nonpayment likely disables the server, leaving a content designer without anything to work with.

Accordingly, there exists a need for a simplified computer program product to meet the needs left unfulfilled by the prior art. More specifically, there exists a need for a computer program product to perform the steps of querying a content designer for information sought, organizing the information, and building a questionnaire interface program using a simple interface that allows a questionnaire to be presented to a client user, and allows for responses entered by the client user to be readily validated.

SUMMARY OF THE INVENTION

The present invention advantageously fulfills the needs lacking in the prior art by providing a computer program product to create a questionnaire interface program which performs the steps of querying the content designer for information sought, organizing the information, and analyzing the information to build the questionnaire interface program.

The computer program product according to an embodiment of the present invention is advantageously capable of performing repetitive steps that may be involved with building a suitable questionnaire or associated data collection interface, quickly creating the desired project based on the desired design and structure of the given data acquisition. The resulting data may then be processed and analyzed to produce reports based on the information collected. The computer program product according to an embodiment of the present invention is highly beneficial for intake data collection, aptitude determination, symptom diagnosis, or a wide variety of additional applications that require information to be entered into forms.

These and other advantages according to an embodiment of the present invention are provide by a computer program product and method for content creation and data management systems and, more specifically, for creating a questionnaire interface program. The computer program product may comprise a database, an interface, and a compiler. The database may include information used to create the questionnaire interface program. The interface may manipulate the information in the database to design the questionnaire interface program. The compiler may build the questionnaire interface program.

The interface may include a site list interface and a page creating interface. The site list interface may be used to manage a questionnaire site to be designed. The page creation interface may be used to design a questionnaire page that includes a question. The questionnaire page may be included in the questionnaire site. Additionally, the question may relate to the questionnaire site.

The question may be presented on the questionnaire page using the questionnaire interface program. The question may be used to elicit a response. The response may be stored within the database. The interface may be used to define the information used to design the question to be included in the questionnaire page. The interface may also be used to define the questionnaire page to be included in the questionnaire site.

The compiler may build the questionnaire interface program using the information included in the database. More specifically, the compiler may use information included in the database comprising core files, data tables, and core user interface files. The core files may be copied to a directory structure. The core files may include code used to define an operation of the questionnaire interface program.

Data tables may also be processed. The data tables may include the information in the database to define the questionnaire site and the questionnaire page to be included in the questionnaire interface program. Additionally, core user interface files may be copied to the directory structure. The core user interface files may include code used to define the interface of the questionnaire interface program.

The compiler may then use the directory structure to build the questionnaire interface program. Additionally, the database may be configured to include a client user account. The client user account may define a client user that can access the questionnaire interface program to provide responses to questions.

The interface may further include a user management interface to define permissions relating to the client user to be included in the database. The permissions may allow the client user to access the questionnaire interface program and be presented the question. Additionally, a content designer account may be included in the database to define a content designer. The questionnaire site may be associated with the content designer account.

According to an embodiment of the present invention, the interface may further include an answer validation interface to define a valid response to the question. The response provided by the client user to the question may be selectively validated by comparing the response to the question provided by the client user to the valid response. Either or both of the information included in the database and the response to the question may be analyzed to generate a report.

According to an embodiment of the present invention, the questionnaire interface program may be stored on a server. The server may be connected to a network to serve the questionnaire interface program and to receive the response though the network. One or more computerized device may be included that may store the database, operate the interface, and build the questionnaire interface program.

The interface may include a database configuration interface to define a database structure for the database. The database structure may define the database to include an associated database, a database of registered usernames, and a client user response. The associated database may store the information used to generate the questionnaire interface program. The database of registered usernames may store data defining a content designer. The client user response database may store the response from the client user. The database configuration interface may be used to define a code base used to build the questionnaire interface. An alert may be generated upon an occurrence of an event; and wherein the alert is transmittable.

A method operation according to an embodiment of the present invention may be included for creating a questionnaire interface program using the computer program product. The method may include the step of designing the questionnaire site using the site list interface. The method may further include designing a questionnaire page using the page creation interface. The questionnaire page may be included in the questionnaire site, which may present a question to elicit a response to be stored within the database.

The method may additionally include compiling the questionnaire interface program using the information included in the database. Compiling the questionnaire interface program may initially include copying core files from the database to a directory structure. The core files may include code used to define an operation of the questionnaire interface program. Compiling the questionnaire interface program may also include processing data tables that include the information in the database to define the questionnaire site and the questionnaire page. Compiling the questionnaire interface program may further include copying core user interface files from the database to the directory structure. The core user interface files may include code used to define the interface.

The method may additionally include configuring the database to include a client user account. The client user account may define a client user that can access the questionnaire interface program to provide the response to the question. Furthermore, the method may include building the questionnaire interface program using the directory structure.

DETAILED DESCRIPTION OF THE PREFERRED EMBODIMENTS

Figure 1:
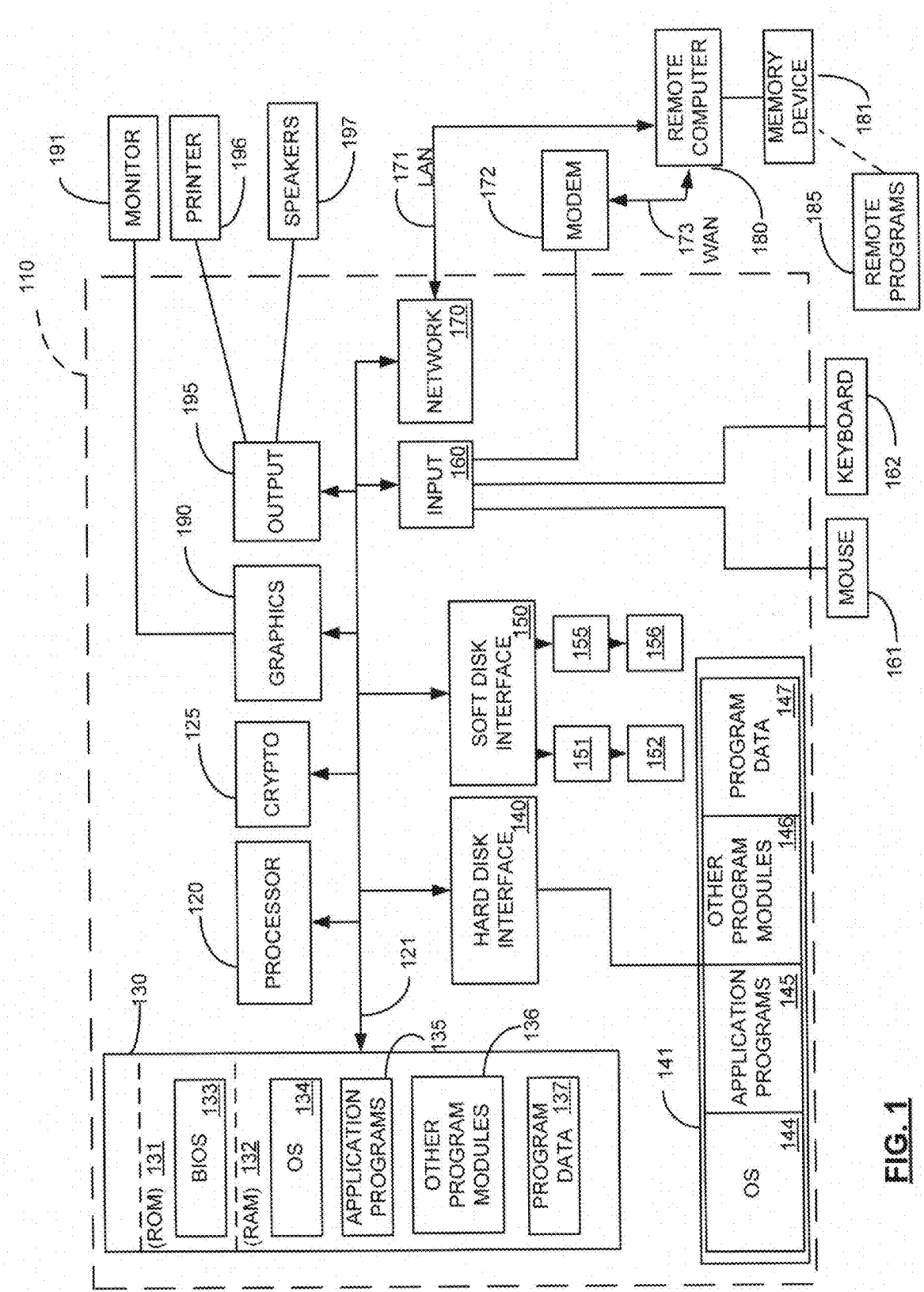
FIG. 1 is a block diagram of a computer, which may be configured to perform certain machine-implemented steps embodied within one or more method aspects of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Embodiments of the present invention are described herein in the context of a system of computers, servers, and software. Those of ordinary skill in the art will realize that the following embodiments of the present invention are only illustrative and are not intended to be limiting in any way. Other embodiments of the present invention will readily suggest themselves to such skilled persons having the benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps, and/or data structures may be implemented using various types of operating systems, computing platforms, computer programs, and/or general purpose machines. In addition, after having the benefit of this disclosure, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The computer program product 10 for generating a questionnaire interface program 92, according to an embodiment of the present invention, may be a computerized system that requires the performance of one or more steps to be carried out on or in association with a computerized device. A person of skill in the art will appreciate that the computerized device may include, but not be limited to, a server, a computer (i.e., desktop computer, laptop computer, netbook, or any machine having a processor), a dumb terminal that provides an interface with a computer or server, a personal digital assistant, mobile communications device, such as a mobile phone, smart phone, or other similar device that provides computer or quasi-computer functionality, a mobile reader, such as an electronic document viewer, which provides reader functionality that may be enabled, through either internal components or connecting to an external computer, server, or global communications network (such as the Internet), to take direction from or engage in processes which are then delivered to the mobile reader. It should be readily apparent to those of skill in the art, after reviewing the materials disclosed herein, that other types of devices, individually or in conjunction with an overarching architecture, associated with an internal or external system, may be utilized to provide the "computerized" environment necessary for the process step to be carried out in a machine/system/digital environment. It should be noted that the method aspects of the present invention are preferably computer-implemented methods and, more particularly, at least one step is preferably carried out using a computerized device.

FIG. 1 illustrates a computing device in the form of a computer 110, which is capable of performing one or more computer-implemented steps in practicing the method aspects of the present invention. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In other embodiments, the functions of the cryptographic unit may be instantiated in software and run via the operating system.

A computer 110 typically includes a variety of computer readable media. Computer readable media can be any available media that can be accessed by a computer 110 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates an operating system (OS) 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives, and their associated computer storage media discussed above and illustrated in FIG. 1, provide storage of computer readable instructions, data structures, program modules and other data for the computer 110. In FIG. 1, for example, hard disk drive 141 is illustrated as storing an OS 144, application programs 145, other program modules 146, and program data 147. Note that these components can either be the same as or different from OS 134, application programs 135, other program modules 136, and program data 137. The OS 144, application programs 145, other program modules 146, and program data 147 are given different numbers here to illustrate that, at a minimum, they may be different copies. A user may enter commands and information into the computer 110 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

The communications connections 170 and 172 allow the device to communicate with other devices. The communications connections 170 and 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

According to an embodiment of the present invention, a computer program product 10 is disclosed, which may be capable of creating a web interface for use in data acquisition, establishing a database management system, and building an application based on the user data entered. A computer program product 10, according to an embodiment of the present invention, will be described in further detail as a project that is creatable using, for example, but not intended as a limitation, Microsoft's Visual C# .NET development environment. Such a computer program product 10 would be suitable for execution on a computer 110 having, for example, but not intended as a limitation, one of Microsoft's Windows family or Apple's Mac OSX family of operating systems loaded into memory 134. A person having skill in the art, after having the benefit of this disclosure would recognize that many other development platforms might be used to create a computer program product 10, which may be executable with many other operating systems, but that still embody the present invention. As such, the following disclosure is provided merely for explanatory purposes and should in no way limit the present invention to computer program products 10 that are created using the aforementioned development platform or for use with the aforementioned operating systems.

A computer program product 10, according to an embodiment of the present invention, may be capable of presenting an interface 50 to a user (sometimes referred to throughout this disclosure as a content designer), which may be designed to collect all of the information required to build a desired questionnaire interface program 92. Such an interface 50 might be capable of collecting information in regard to questions to be asked (or presented through an interface to a client user), general answer responses, and validated answer responses. In addition, such an interface 50 may present various other options that can be selected by a content designer.

Figure 2:
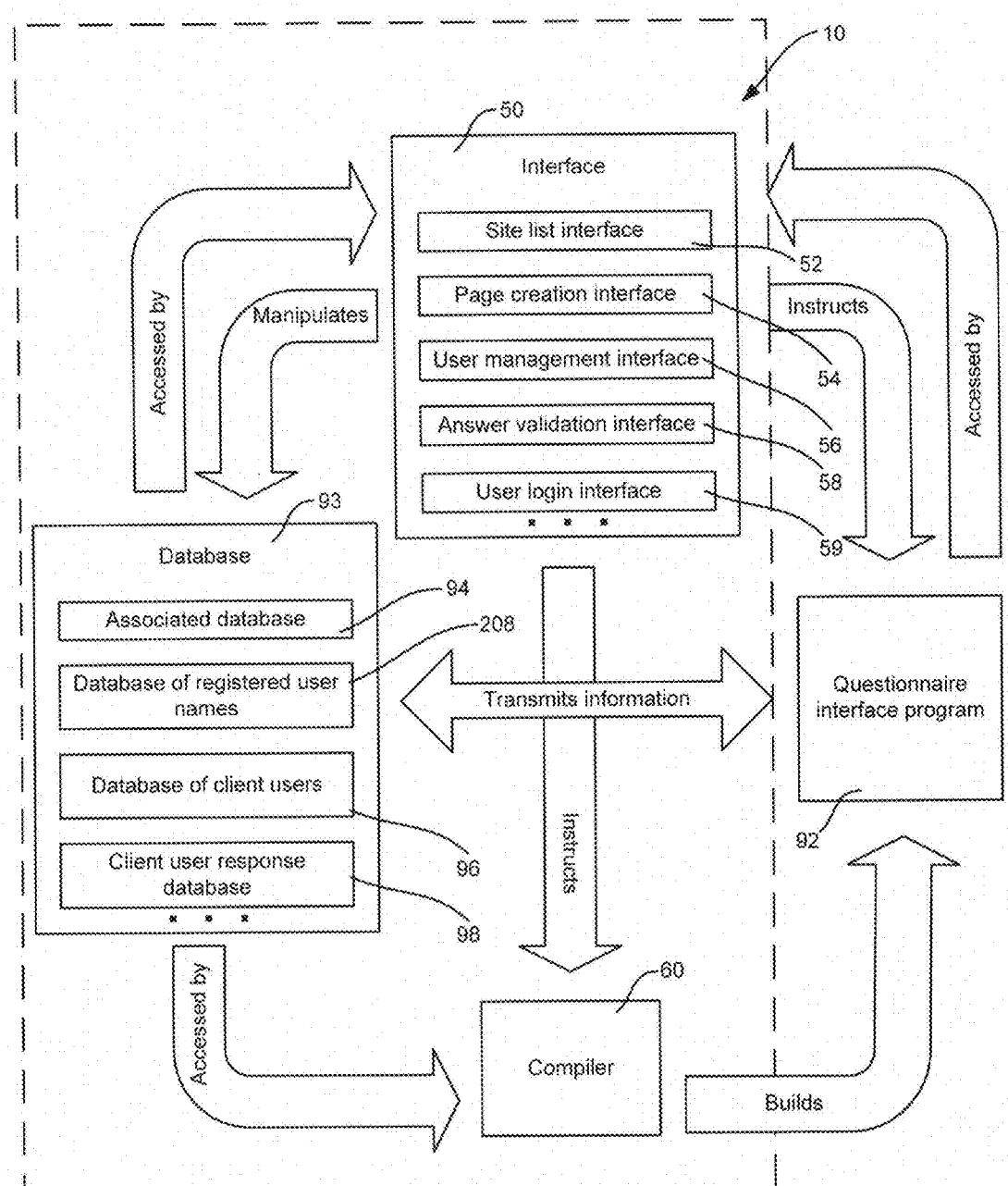
FIG. 2 is a block diagram of a computer program product according to an embodiment of the present invention.

Referring now to FIG. 2, the computer program product 10, and the operation thereof, will now be discussed. The computer program product 10 may generally include an interface 50, a database 93, and a compiler 60. The computer program product 10 may be used to create a questionnaire interface program 92. A person of skill in the art will appreciate that use of the term "database" within this disclosure is intended to encompass multiple databases, and is used generally to refer to a database structure that may store data or information.

The interface 50 may allow a user, such as a content designer, to manipulate the information included in the database 93, which may be accessed using the interface 50. Additionally, the interface 50 may be used to instruct the compiler 60 to build a questionnaire interface program 92. Furthermore, the interface 50 may be used to instruct and interact with the questionnaire interface program 92, allowing the information generated using the questionnaire interface program 92 to be accessed using the interface 50. A person of skill in the art will appreciate that additional interfaces 50 may be used to access and interact with the questionnaire interface program 92, for example, which may be connected remotely over a network.

The interface 50 may include one or more subset interfaces, through which a content designer may manipulate the information included in the database 93. For example, the interface 50 may include a site list interface 52, a page creation interface 54, a user management interface 56, an answer validation interface 58, a user login interface 59, and any number of additional interfaces through which the computer program product 10 may be interacted. Also, any of the aforementioned subset interfaces may include additional interfaces through which a user may interact with the computer program product 10, according to an embodiment of the present invention. The function of the aforementioned interfaces will be further discussed below.

In addition to interoperation with the interface 50, the database 93 may communicate with the compiler 60 and the questionnaire interface program 92, among other components. The database 93 may include the information used to build the questionnaire interface program 92, which may be accessed by the compiler 60. The database 93 may additionally be used to transmit information between itself and one or more questionnaire interface programs 92. However, a person of skill in the art will appreciate that the questionnaire interface program 92 may include its own database, or may be connected to any number of databases, e.g., connected remotely over a network.

The database 93 may include one or more subset databases, which may include information that may be manipulated by a user, such as a content designer. The database 93 may additionally include code, data tables, and other data that may be used by the compiler 60 to build the resulting questionnaire interface program 92. For example, the database 93 may include an associated database 94, a database of registered user names 208, a database of client users 96, a client user response database 98, and any number of additional databases. The aforementioned subset databases will be further discussed below.

The compiler 60 may be operated to build the questionnaire program 92. The building operation may be initiated by a user through the interface 50. The compiler 60 may also access information and code included in the database 93. The compiler 60 may use the information and code to build the resulting questionnaire interface program 92.

The questionnaire interface program 92 may present one or more questions to a client user to elicit a response. The questionnaire interface program 92 may be accessed and interacted with through the interface 50. Alternatively, the questionnaire interface program 92 may be accessed by a remotely connected interface, which may not be included in the computer program product 10 of the present invention.

As the questionnaire interface program 92 may be interacted with, it may generate information. Such information may include, for example, responses to the questions presented to a client user. This information may be transmitted between the questionnaire interface program 92 and a database, such as the database 93 included in the computer program product 10 of the present invention. However, a person of skill in the art will appreciate that additional databases may be used to intercommunicate information with the questionnaire interface program 92. Such additional databases may, for example, be included within the questionnaire interface program 92 or be remotely connected over a network.

Figure 2A:
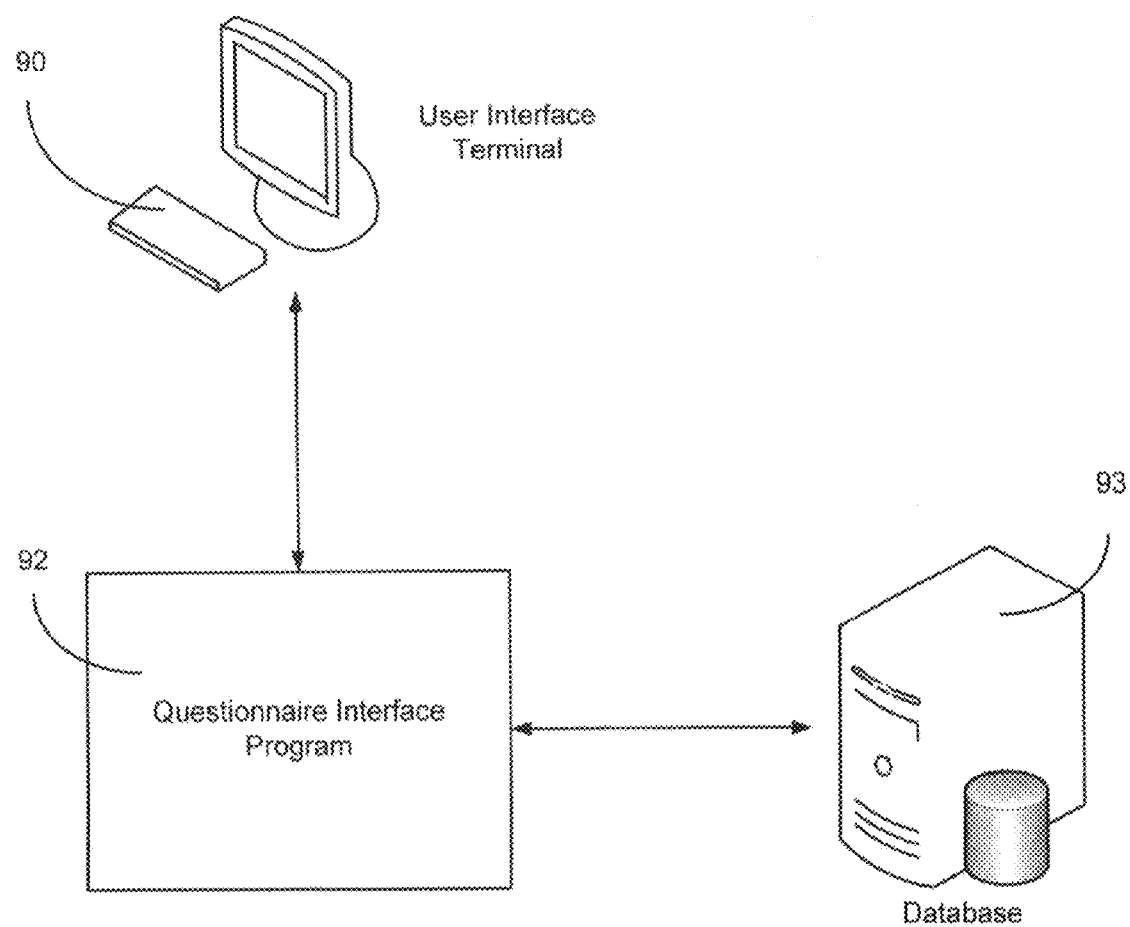
FIG. 2A is a schematic block diagram of a user interface terminal in communication with a questionnaire interface program and an associated database according to an embodiment of the present invention.

FIG. 2A illustrates a schematic block diagram of a model user interface terminal 90, through which a client user may interact with a questionnaire interface program 92 that has been created by the computer program product 10. The questionnaire interface program 92 may interact with a database 93, such as, for example, an associated database 94. The database 93 may store client responses and information to be interpreted by the content designers or other questionnaire administrators. A person of skill in the art will appreciate additional databases 93 capable of including and providing access to information that may be included with the computer program product 10 of the present invention, and should not view the invention as being limited to the databases listed above.

Figure 3:
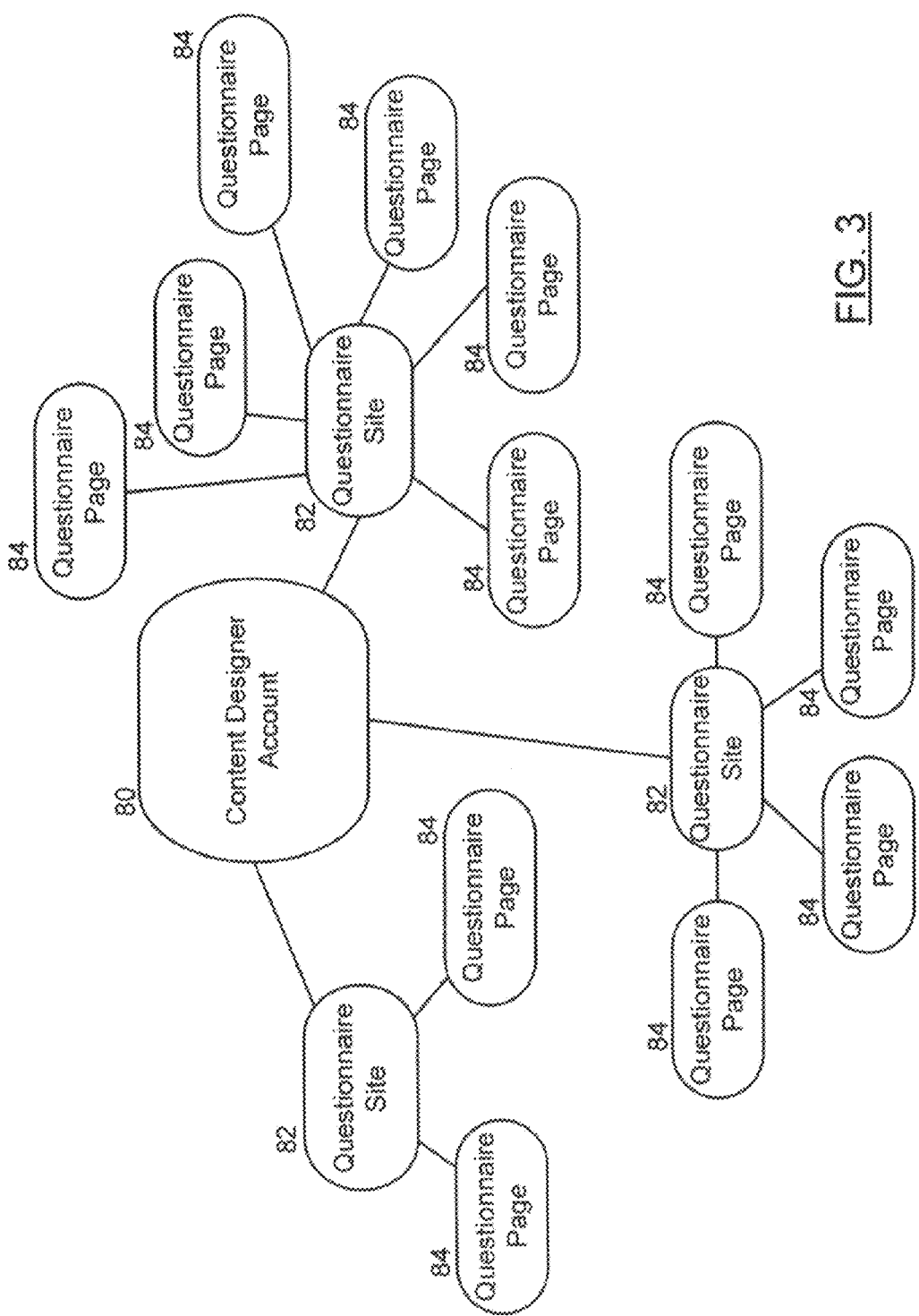
FIG. 3 is a block diagram illustrating a relationship between questionnaire interface program levels and a user account according to an embodiment of the present invention.

FIG. 3 illustrates a block diagram for the hierarchical organization of a compiled and built questionnaire interface program 92. In the present embodiment, each content designer may register a content designer account 80. The computer program product 10 can build questionnaire interface programs 92 for multiple content designer accounts 80. The computer program product 10 may also build multiple questionnaire interface programs 92 for a single content designer account 80. A specific and non-limiting example of such a computer program product 10 may include a questionnaire generation program. Each content designer account 80 may be capable of including multiple questionnaire sites, which may be built into one or more questionnaire interface programs 92. A questionnaire site 82 may generally be considered as a collection of questions and/or prompts intended to illicit a user response. Similarly, each questionnaire site 82 may be comprised of a collection of questionnaire pages 84, or, more generally, individual inquiries presented to a user for the purpose of eliciting a response. The questionnaire page 84 may include one or more questions. In some embodiments, the questionnaire page 84 may alternatively include a partial question, for example, wherein a question is too lengthy to fit within a single questionnaire page 84.

Figure 4:
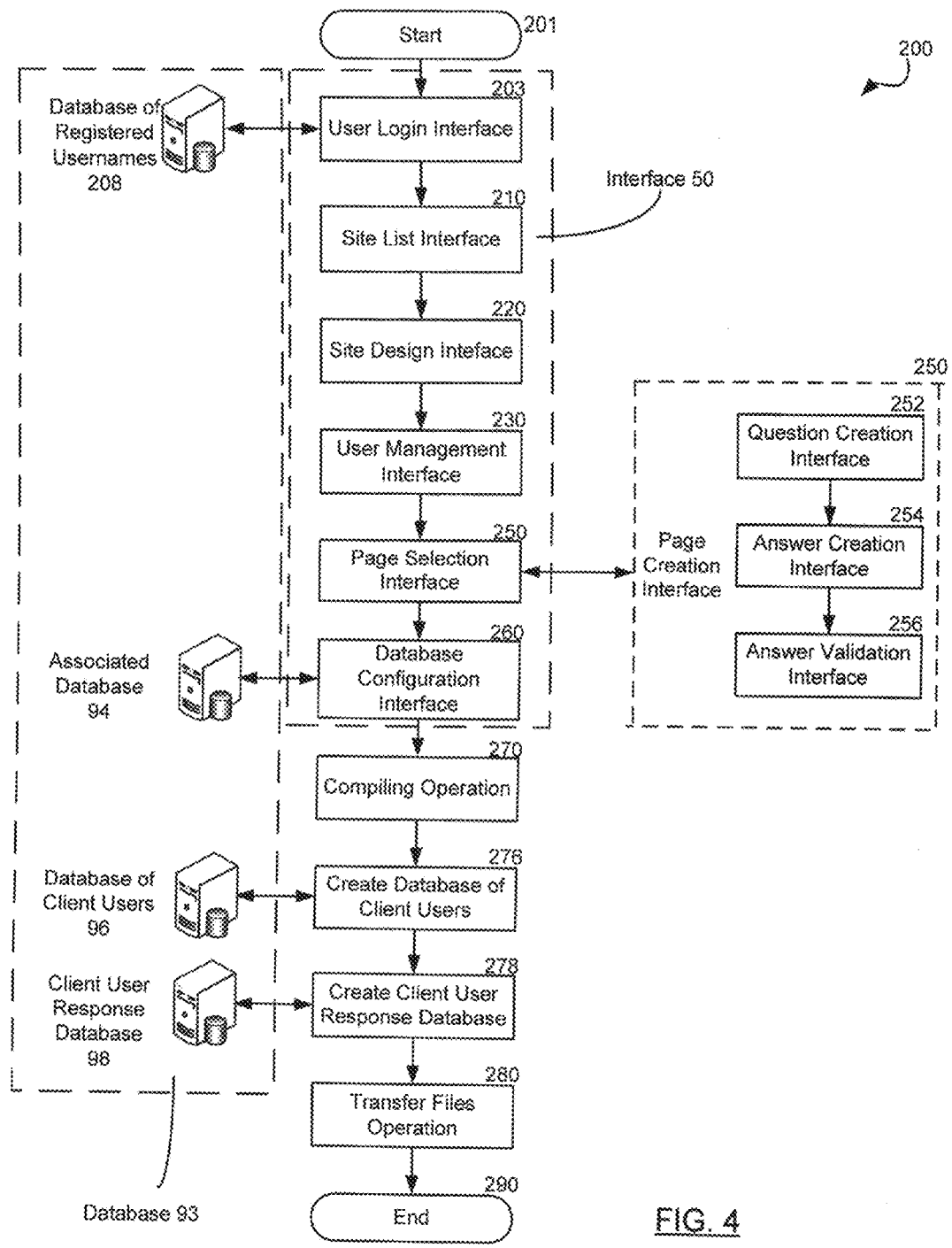
FIG. 4 is a flowchart illustrating the steps performed by a the computer program product for creating the questionnaire interface program according to an embodiment of the present invention.

FIG. 4 illustrates, as a method aspect of an embodiment of the present invention, an exemplary process of creating a questionnaire site 82 though content designer interaction with the computer program product 10, generally. A person of skill in the art will appreciate the following embodiment is not intended to be limiting, and that alternate programming configurations exist within the art are included within the scope and spirit of the present invention.

Referring to the flowchart 200 of FIG. 4, an illustrative method aspect of the present invention is now described in greater detail. A person of skill in the art will appreciate that the following method aspect is provided in the interest of clarity, and will appreciate additional method aspects existing within the scope of the present invention to be included in this disclosure.

Starting at Block 201, a user may be authenticated into the system through a user login interface 59 (Block 203), which may be accessed, for example, by a content designer. Through the user login interface 59, the computer program product 10 may compare the credential entered by the content designer with a database 93, such as a database of registered usernames

208. Next, the content designer may manage one or more questionnaire sites 82. Managing a questionnaire site 82 may include selecting to modify, or create a new questionnaire site 82 through a site list interface 52 (Block 210). As further illustrated in the flowchart 200, if the content designer wishes to create a new questionnaire site 82, the computer program product 10 may optionally navigate to a site design interface, if a customized design is desired (Block 220). In alternate embodiments, a default site design may be used. Next, the content designer may choose user permissions through a user management interface 56 (Block 230). Here, the content designer may define one or more client users and/or permissions relating thereto. Client users may optionally be capable of self-registration.

After setting user permissions, the content designer may choose to create a questionnaire page 84 though a page creation interface 54 (Block 250). The content designer may navigate to a page creation interface 54 to select and/or create the questionnaire page 84 (Block 250). The questionnaire page 84 may be defined to include questions, which may be presented to a client user to elicit a response. The content designer may continue to create additional questionnaire pages 84 through the page creation interface 54 until the desired number of questionnaire pages 84 has been created (Block 250). The format and structure of the database 93 to be accessed and modified by the questionnaire interface program 92, such as, for example, an associated database 94 may next be chosen through a database configuration interface (Block 260).

With the questionnaire sites 82 and pages 84 defined, and with the format and structure of the database 93 chosen, the compiler 60 of the computer program product 10 may build the questionnaire interface program 92. The creation of the questionnaire interface program 92 may occur through a compiling or building operation (Block 270). A person of skill in the art will appreciate the compilation operation of a program from information provided by a content designer and/or libraries of code, which may be included or imported into the computer program product 10 of the present invention. A compilation of computerized code may already be understood within the art. After compiling or building the questionnaire interface program 92, the computer program product 10 may define additional databases, such as a database of client users 96 (Block 276) and a client user response database 98 (Block 278). After completing the compilation and database definition, the generated questionnaire interface program 92 may be transferred to a server through a transfer files operation (Block 280). Alternatively, the built questionnaire interface program 92 may be downloaded or transferred to an alternate location, which may be specified by, for example, the content designer. The operation of the computer program product 10 may then terminate at Block 290.

Figure 5:
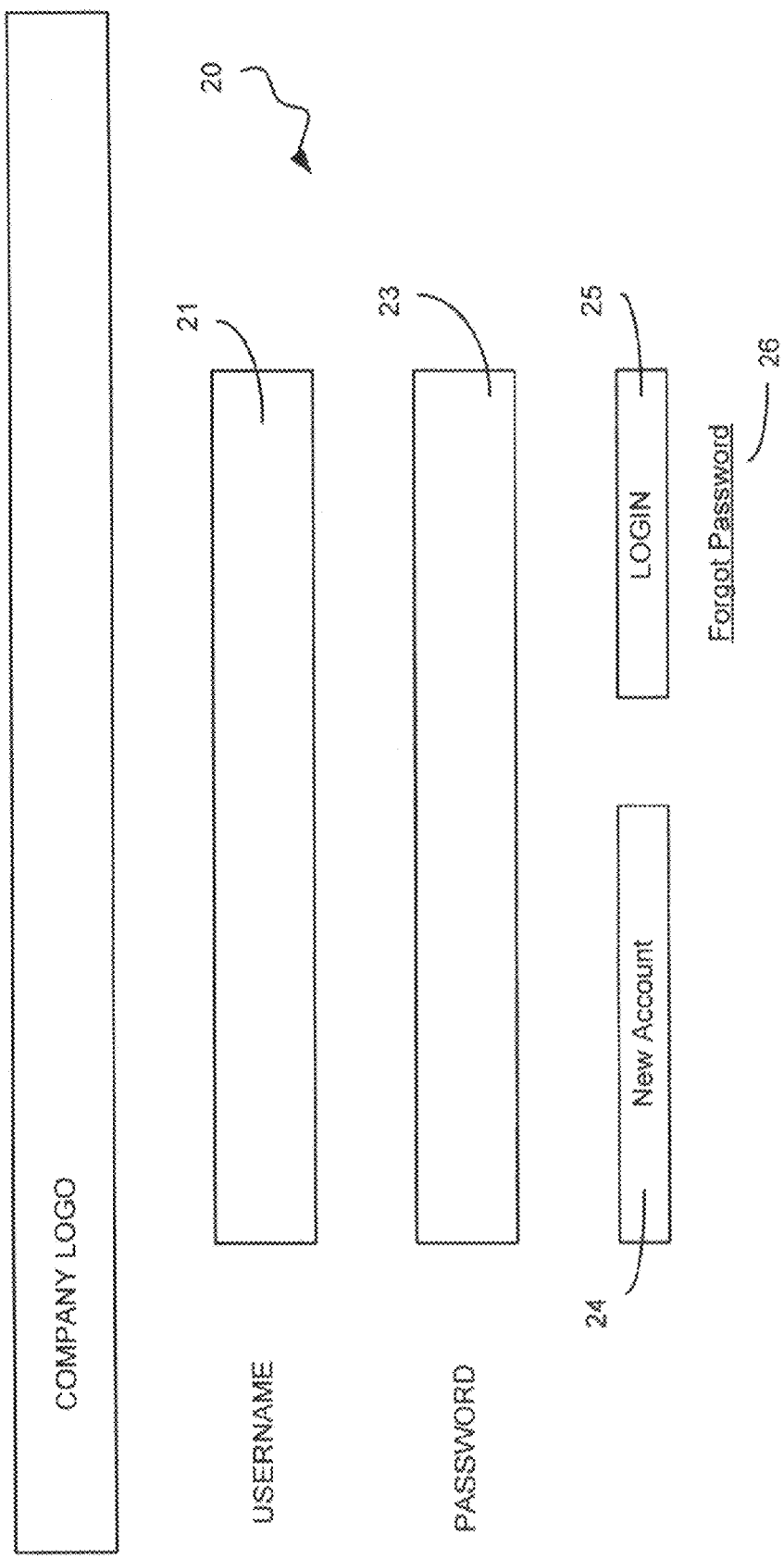
FIG. 5 is a schematic representation of a content designer login interface of the computer program product according to an embodiment of the present invention.

Referring now to FIG. 5, a schematic representation 20 is provided, in accordance with an embodiment of the present invention, for a model interface for a content designer to interact with the computer program product 10. More specifically, FIG. 5 illustrates a schematic representation 20 of a user login interface 59, according to the present invention. Although the following example interface presents a model structure for interaction with the user login interface 59 of the computer program product 10, a person of skill in the art will appreciate additional related interfaces to be included in this disclosure, with options and features relative to their respective purposes, that allow the interaction between additional design and configuration interfaces of the computer program product 10 and the content designer. Additionally, a person of skill in the art will appreciate alternate functional and stylistic combinations of various fields and components, in addition to the fields and components discussed in the example below, which would be included within the scope and spirit of the present invention.

For illustrative purposes, the following example relates to the user login interface 59, which is suitable for display on a monitor 191, or other object capable of providing visual feedback. The user login interface 59 may also be suitable for collecting information about the desired login credentials relating to a content designer account 80. The content designer account 80 may include, among a plethora of possible information fields and/or variables, a "username" input field 21, a "password" input field 23, a "new account" button 24, a "login" button 25, and a "forgot password" link 26.

Referring to FIGS. 3 and 5, additional features of the computer program product 10, according to an embodiment of the present invention, will now be described in greater detail. More specifically, a "username" input field 21 may be provided in the form of a text box, as understood by those having skill in the art. Such a text box may be capable of taking an input provided by depressing the appropriate keys on a keyboard 162 while the input focus is within the "username" input field 21. A "username" input field 21 and a "password" input field 23 may be presented to a content designer to allow the content designer to authenticate the content designer account 80 into the computer program product 10. After entering credentials within the "username" input field 21 and "password" input field 21, the content designer may click the "login" button 25. Next, the computer program product 10 may preferably compare the submitted credentials with a database 93, such as, for example, a database of registered usernames 28. If the credentials entered by a user for access to a content designer account 80 match a valid entry in the database of registered usernames 28, the computer program product 10 may proceed to a site list interface 52.

If the database of registered usernames 28 does not contain a content designer account 80 that matches the credentials entered by the content designer into the "username" input field 21 and "password" input field 23, or if the content designers access has otherwise been restricted, the computer program product 10 may return an error informing the content designer that his or her entry is invalid. Optionally, if the content designer has forgotten his or her corresponding password credentials, the content designer may click on the "forgot password" link 26. This action may result in the system electronically transmitting the password database entry via an electronic data transfer protocol, such as, for example, e-mail.

If a content designer desires to create a new content designer account 80, he or she may click on "new account" button 24. This action may navigate the new content designer to an account setup interface, allowing the content designer to create a content designer account. After the content designer account 80 has been created, the account may be stored in a database 93, such as the database of registered usernames 208. A company logo, for example, or other identifying indicia, may optionally be included in the interface.

Figure 6:
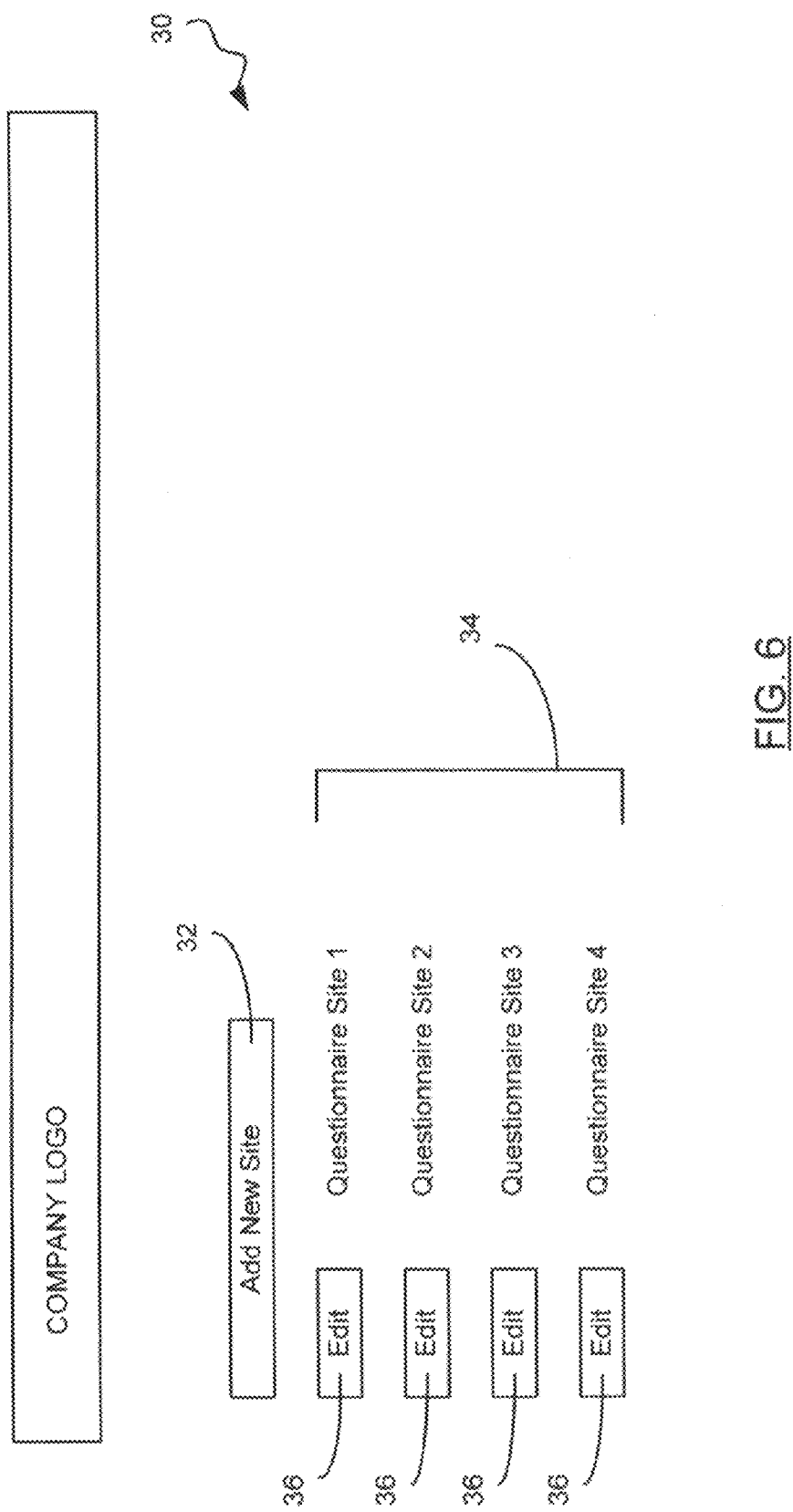
FIG. 6 is a schematic representation of a questionnaire site selection interface of the computer program product according to an embodiment of the present invention.

FIG. 6 illustrates an example of the site list interface 52 of the computer program product 10 according to an embodiment of the present invention. After the content designer has been properly identified, and the corresponding content designer account 80 has been logged into the computer program product 10, the content designer may be directed to the site list interface 52. The site list interface 52 may provide a list of current available questionnaire sites 82. In this embodiment, a questionnaire site 82 may include a collection of questionnaire pages 84 created to present questions and gather responses and information from a client user.

The content designer may manage one or more questionnaire sites 82 through the site list interface 52. More specifically, the content designer may choose to create a new questionnaire site 82 by clicking on the "add new site" button 32. The content designer may also be presented with a list of existing questionnaire sites 34. Beside each existing questionnaire site 82, a "modify site" button 216 may be located to allow the content designer to modify the questionnaire pages 84 and settings associated with an existing questionnaire site 82. A company logo may optionally be included in the interface. Additionally, a content designer may remove a questionnaire site 82.

Referring additionally to FIG. 4, if the content designer chooses to create a new questionnaire site 82, the content designer may be directed to a site design interface, where the content designer may select the structure and appearance of the questionnaire interface program 92 generated. Through the site design interface, the content designer may choose to upload a preconfigured site template in a format known in the art, such as, for example, a cascading style sheet (CSS) or other relevant formats. The content designer may also choose to use a default or preprogrammed formatting structure and design for the questionnaire site 82 being designed. The preprogrammed formatting structures may be included locally or in a remotely connected database 93. Additionally, the preprogrammed formatting structures may be static or updated periodically and/or dynamically. Furthermore, a person of skill in the art will appreciate the use of custom and/or dynamic site templates and formatting structures to be included within the scope of the present invention.

After uploading or configuring the formatting for the questionnaire site 82, the content designer may be directed to a user management interface 56. Through the user management interface 56, the content designer may configure settings relating to user access privileges, user profiles, or other settings related user interaction with the questionnaire interface program 92. A person of skill in the art will appreciate additional configurable settings within the scope and spirit of the present invention.

Figure 7:
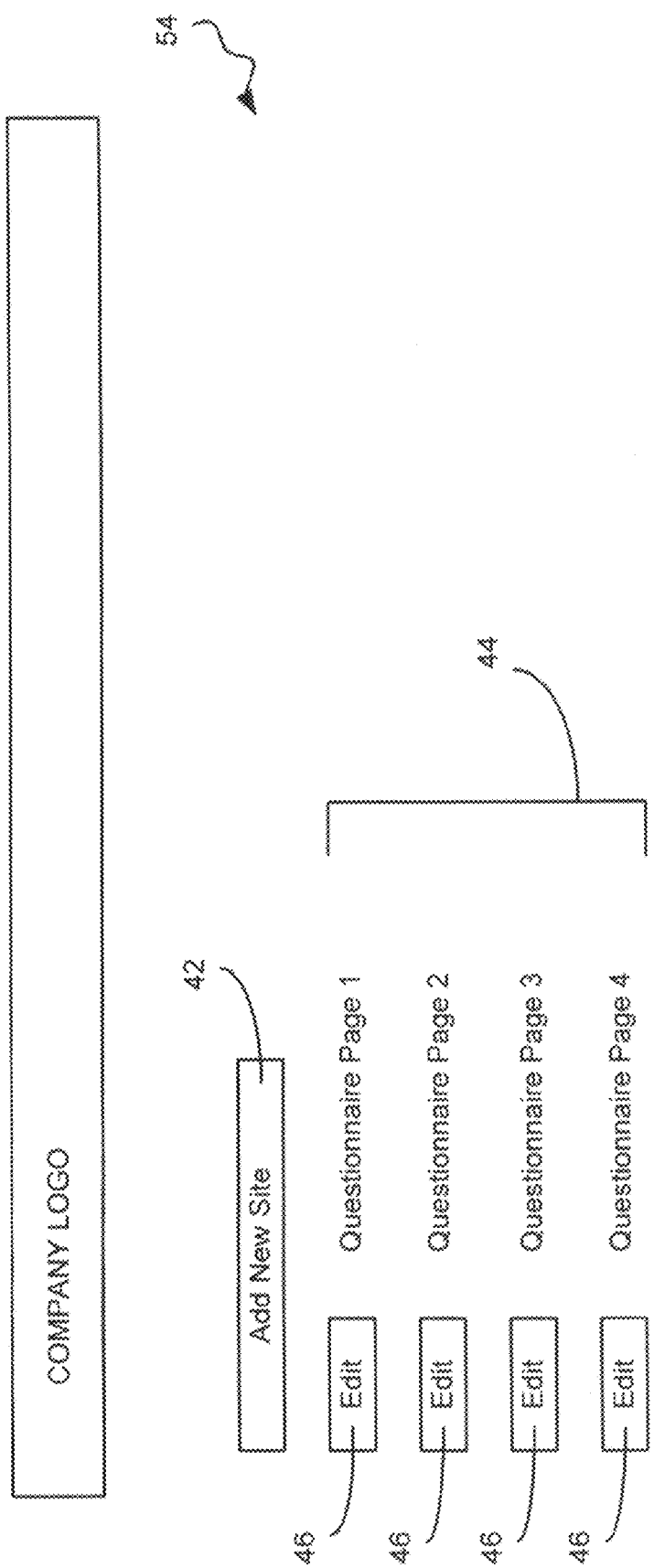
FIG. 7 is a schematic representation of a questionnaire page selection interface of the computer program product according to an embodiment of an embodiment of the present invention.

In the present embodiment of the computer program product 10, after the content designer has set up the questionnaire site 82 formatting, design, and user interaction parameters, the content designer may be directed to a page creation interface 54, as illustrated in FIG. 7. The page creation interface 54 may allow the content designer to modify or create questionnaire pages 84 associated with the current questionnaire site 82. To create a new questionnaire page 84, the content designer may engage the "add new page" button 42 to navigate the content designer to a page creation interface 54. The content designer may also be presented with a page list 44, which may display existing questionnaire pages 84. A page "edit" button 46 may be included adjacent to each existing questionnaire site 82 to allow a content designer to modify the content of the questions presented to the client user and the method of presentation and data collection.

Referring back to FIG. 4, once the content designer has entered the page creation interface 54 at Block 250, the computer program product 10 may direct the content designer to a question creation interface (Block 252). Through the question creation interface, the content designer may submit the question, which may be defined by, for example, a string of text or an image. A person of skill in the art will appreciate additional methods of storing question entries entered through a content designer interface, within the scope and spirit of the present invention.

The content designer may next navigate to an answer creation interface (Block 254) to define a valid response to which a response may be compared. A person of skill in the art will appreciate that the questions included within a questionnaire page 82 may not necessarily be associated with a valid response. Some questions may be presented to a user with the interest of data collection, wherein the response to such question may be intentionally open ended to elicit a custom response from a client user.

Similar to the interaction with the question creation interface, the content designer may define the valid response, or a desired response, and answer selections that may relate to one or more question through the answer creation interface at Block 254. The content designer may optionally navigate to an answer validation interface (Block 256), at which the content designer may desire to validate one or multiple answer responses, which may be entered through the answer creation interface, to be categorized as "correct" or otherwise desired responses. Answer validation may be selectively enabled depending on whether a situation requires a response to be validated. Without limitation, answer validation may be selectively enabled through the answer validation interface.

The answer validation interface 256 may be particularly beneficial when the content designer desires to create a questionnaire interface program 92 that operates in testing mode. In the present embodiment, the content designer may navigate through the page creation interface 54 until the content designer has generated a satisfactory number of questionnaire pages 84. A person of skill in the art will appreciate additional or different architectural structures for the page creation interface 54 that may accomplish the same result as the disclosed embodiment to be included in this disclosure. Such differences may include, but should not be limited to, the combination of creation interfaces, the reordering of creation interfaces, or the addition of creation interfaces for customized fields as may be desired by the content designer.

Figure 7A:
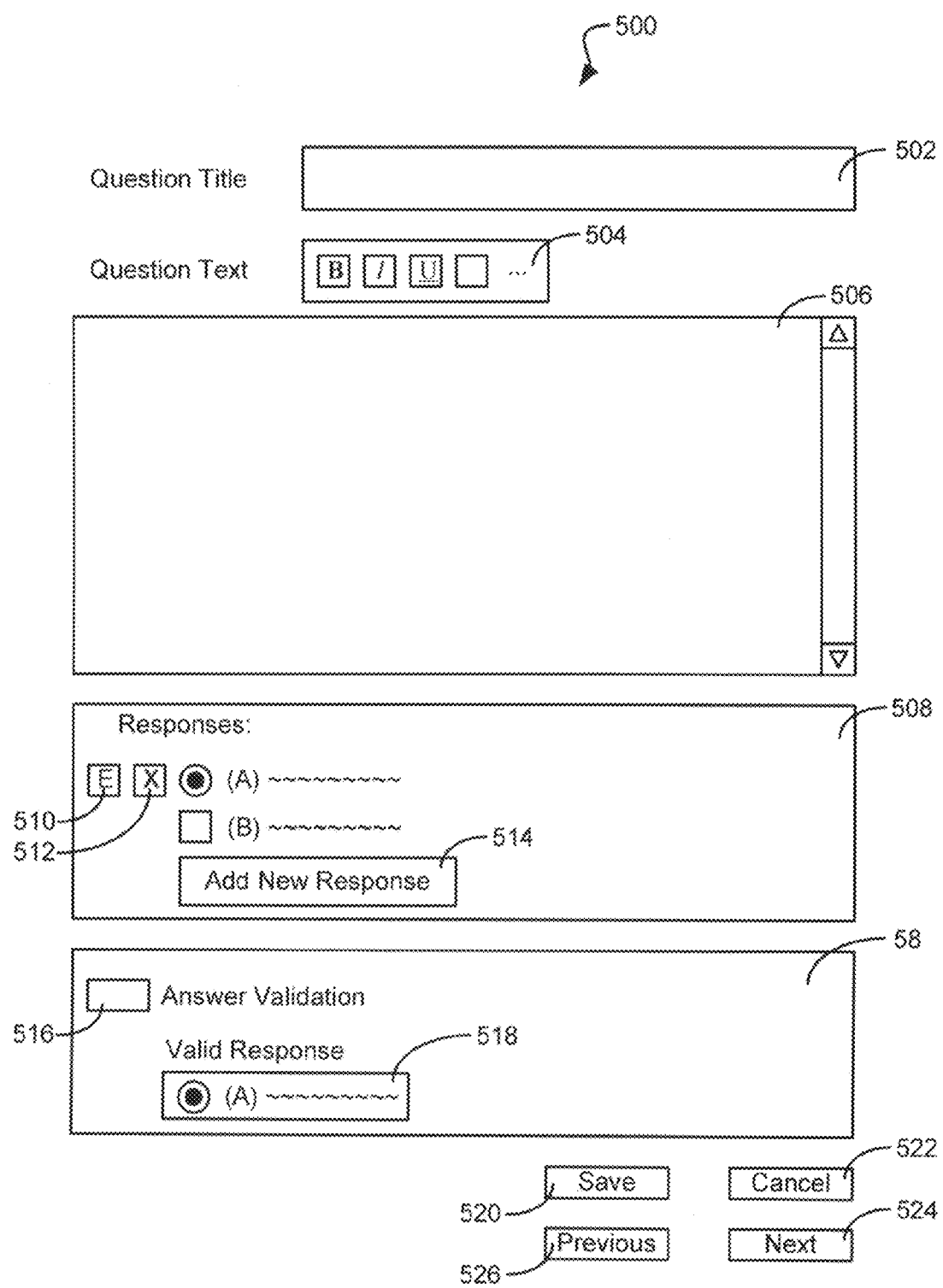
FIG. 7A is an additional schematic representation of a questionnaire page selection interface of the computer program product according to an embodiment of an embodiment of the present invention.

Referring now to the diagram 500 of FIG. 7A, an example of an additional interface, which may be included as part of the page creation interface 54, will now be discussed. It would be understood by skilled artisans that one or more of the elements of this model interface may be included or omitted from the page creation interface 54, as may be desired by the specific application of the computer program product 10, according to an embodiment of the present invention. Additionally, one or more of the elements of the page creation interface 54, if included, may be optionally left incomplete, as it may be applicable to an embodiment of the present invention. Thus, a person of skill in the art will not read any limitations into the following interface, which may be included as part of the page creation interface 54.

The present interface of the page creation interface 54 may include a question title field 502, wherein a content designer may enter a title for the question that may be presented to a client user. If no title is desired to accompany the question, for example, the question title field 502 may be left blank. The content designer may submit the content of the question into a question text box 506. Skilled artisans will appreciate that additional content, beyond merely text, may be included within the question text box 506. Examples of additional content may include one or more image, video, audio sample, interactive module, or other content that may be presented to a client user receiving the question. The content entered into the question text box 506 may be modified by one or more content modifiers 504. Example of content modifiers may include, but should not be limited to, bolding, italicizing, underlining, highlighting, or otherwise modifying the content included in the question text box 506.

The form of response to be received by, and potentially selected by, the client user may be defined in the response box 508. Examples of response formats may include, but should not be limited to, radio buttons, checkboxes, menus, drop-down lists, text fields, buttons, or other elements that may be interfaced by a client user as he or she may interface with the generated questionnaire interface program 92. A content designer may additionally be provided an edit button 510, through which the content designer may edit the response selectable through the generated questionnaire interface program 92. Additionally, a content designer may be presented a delete button 512 to delete a previously defined response.

The present interface of the page creation interface 54 may be linked with, or include, an answer validation interface 58 to define a validated answer. The validated answer may be compared with the response provided by a client user to determine whether the provided response is valid. In other words, without limitation, in testing scenarios, the answer validation interface 58 may be used to define a correct answer against which a client user's response may be graded. The answer validation interface 58 may include a validation enablement checkbox 516, which may enable or disable the validation of the responses provided by a client user with the valid response defined by the content designer. Additionally, a valid answer may be defined at the valid answer field 518.

The present interface of the page creation interface 54, as illustrated in diagram 500, may include a plurality of buttons to interact with the interface. A save button 520 may be included to save the content that has been entered into the page creation interface by, for example, a content designer. The information may be saved to the database 93. Additionally, a cancel button 522 may be included to disregard the same content. Optionally, a confirmation message may be present to the content designer to avoid inadvertently disregarding the content entered into the page creation interface 54 upon interacting with the cancel button 522. A next button 524 and a previous button 526 may also be included to allow navigation to design or edit a next questionnaire page 84 or previous questionnaire page 84, respectively.

Once the content designer has configured the options of the questionnaire site 82 and created a satisfactory amount of questionnaire content through the various creation interfaces, the content designer may then navigate to a database configuration interface 260. Through the database configuration interface 260, the content designer may determine the database structure and code base with which the computer program product 10 may compile the questionnaire interface program 92. A person of skill in the art will appreciate that multiple database structures may be capable of accomplishing the functionality of the present invention, and would be included within the scope of the present invention. Similarly, a person of skill in the art will appreciate a plethora of programming languages that may be capable of creating a questionnaire interface program 92 from libraries of code that could included in a code base, which would also be included within the scope and spirit of the present invention.

Figure 8:
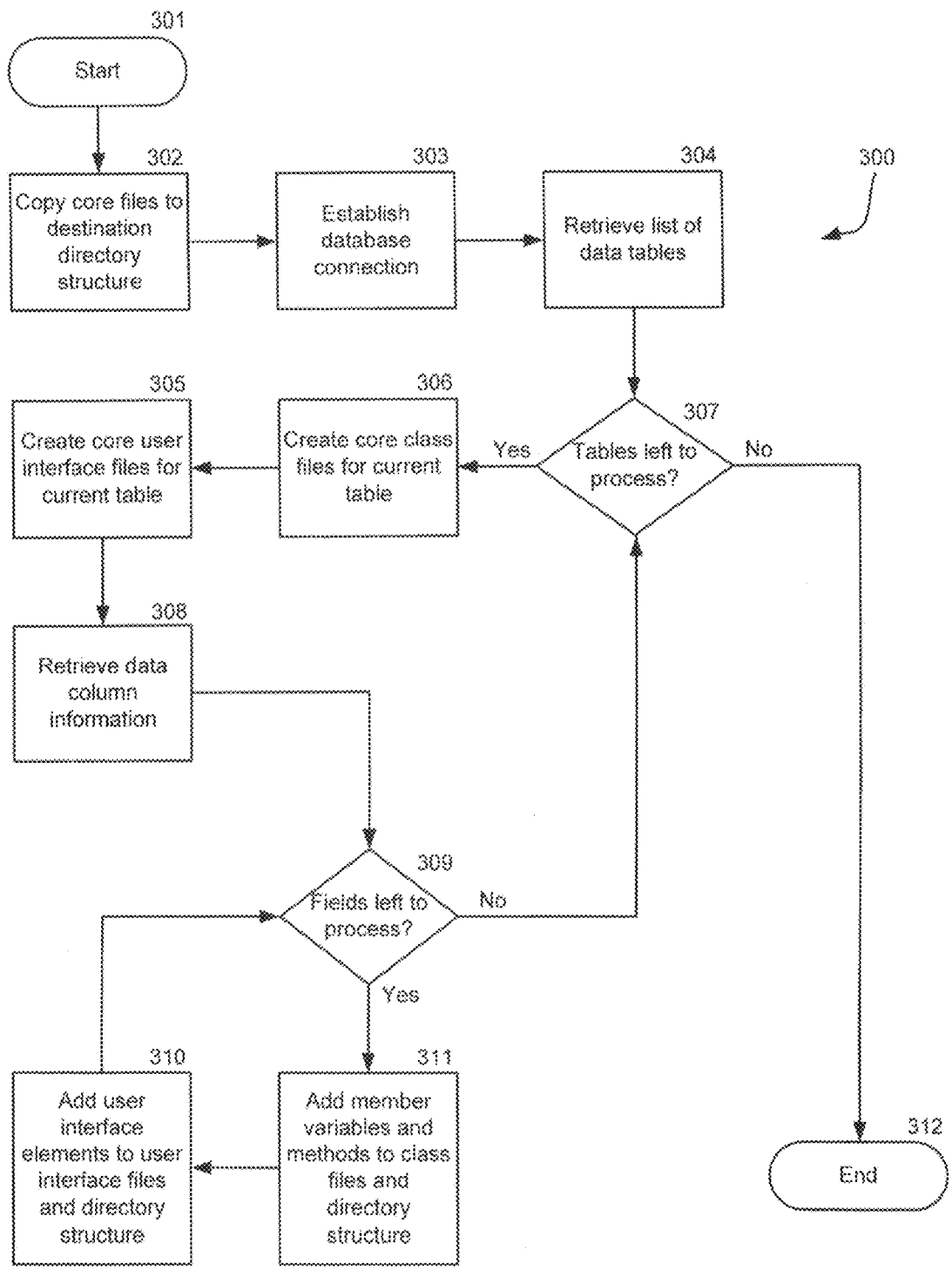
FIG. 8 is a flowchart illustrating a program compile operation for the computer program product according to an embodiment of the present invention.

A non-limiting example of the steps performed to execute a computer program product 10, which creates a questionnaire interface program 92, is illustrated in FIG. 8 as a flowchart 300. A person of skill in the art will appreciate that the following example is provided in the interest of clarity, as additional operations may be include and/or omitted from the following example steps to execute the computer program product 10 according to an embodiment of the present invention. Additionally, a person of skill in the art will appreciate that the resulting questionnaire interface program 92 may be complied or built by using a code base and/or complier associated with any high level or low level programming platform.

A person of skill in the art will appreciate that the following example is intended to illustrate just one possible compiling operation, which may be used to build the questionnaire interface product 92 by using the computer program product 10 of the present invention. Skilled artisans will appreciate that a number of compilers, assemblers, and program generation routines may exist within the art. Skilled artisans will additionally appreciate that such compilers may be included within the scope of the present invention to build the resulting questionnaire interface program 92 from the information entered by content designer through the interface 50. As a result, a person of skill in the art should view the following example as but one illustrative embodiment of a compiling operation, and not limit the invention to the embodiment that follows.

Referring now to flowchart 300, starting at Block 301, a set of core files may be copied in Block 302, to a destination directory structure. A directory structure may be an organized collection of information, data, and code to be used to build a resulting computerized product, such as the questionnaire interface program 92. In the present example, the directory structure may be used, along with information and code included in the database, to build one or more questionnaire interface program 92. It would be apparent to a person having skill in the art, after having the benefit of this disclosure, that certain portions of a questionnaire interface program 92 could be similar or identical from one instance to another, such that certain core files could be stored in a repository and simply copied to a destination directory structure relating to the similar or identical portions of the questionnaire interface program 92. Such core files may include, but should not be limited to, standard project files, core parent class files, the files necessary to implement a standard content designer authentication screen, the files necessary to implement a standard home screen, the files necessary to implement a standard application options screen, or additional files that would be understood by a skilled artisan relating to building common interfaces and pages. It would also be apparent to a skilled artisan that a computer program product 10 for creating questionnaire interface programs 92 might also, instead of copying a set of core files, be designed to create and fill any required core files.

After copying any core files to a destination directory structure in Block 302, the computer program can establish a database connection in Block 303, using the information supplied by the content designer though the creation interfaces. A person having skill in the art, after having the benefit of this disclosure, would appreciate that the steps in Blocks 302, 303, and 304 might be performed in any order, including, without limitation, simultaneously.

After establishing a database connection in Block 303, the computer program product 10 can retrieve a list of data tables in Block 304. The list of data tables may be obtained, for example, but not meant as a limitation, by executing a query statement that is designed to return a record set containing a list of available data tables. The data tables may include the information defined by the content designer relating to the questionnaire interface program 92 to be built. More specifically, the information in the data tables may include questions, answers, appearance settings, a hierarchy of questionnaire sites 82 and pages 84, and other information relating to the questionnaire interface program 92.

Once a list of data tables has been retrieved in Block 304, it can be determined whether there are any tables that have not been processed in Block 307. If it is determined in Block 307 all tables have been processed, the method can end at Block 312. Otherwise, if it is determined in Block 307 that tables remain that have not been processed, a set of core class definition files can be created for the next available table in Block 306. Core class definition files may include suitable classes for performing required operations with the current data table. For example, but not meant as a limitation, a class may be defined with methods for retrieving all records from the current table, updating one or more record in the current table, adding new records to the current table, or deleting one or more records from the current table. A person having skill in the art, after having the benefit of this disclosure, would recognize that suitable table classes may be derived from third-party provided data access objects, such as Microsoft's ADO.NET data table classes. It would be apparent to a person having skill in the art, after having the benefit of this disclosure, that the step in Block 306 may be optionally omitted based on the selections that have been made using the database configuration interface at Block 260 of FIG. 4.

After creating core class definition files in Block 306, core user interface files can be created in Block 305. Core user interface files may contain code that defines the user interface that is presented to a user while using a questionnaire interface program 92 to interact with the current table in the associated database 94. For example, but not meant as a limitation, user interface files may be created to collect information for inserting a new record into the table or for modifying the data in an existing record. A person having skill in the art, after having the benefit of this disclosure, would recognize that appropriate user interface files could be created for many different platforms. For example, but not intended as a limitation, user interface files could be created that are suitable for display in a web browser, such that any client computer 110, which is capable of executing a standard browser, may properly display a user interface that is included in a content management system. As another non-limiting example, appropriate source code files could be created, which are suitable for compilation as a desktop application, using a third-party software development studio, such as Microsoft's Visual C# .NET development environment. It would be apparent to a person having skill in the art, after having the benefit of this disclosure, that the step in Block 305 may be optionally omitted based on the selections that have been made using the database configuration interface.

After core user interface files have been created in Block 305, the computer program can retrieve data information for the current table in Block 308. The data information may include the information entered by the content designer to define the questions to be included in the resulting questionnaire interface program 92. A person of skill in the art will appreciate additional information that may be entered by the content designer that may relate to the generation of the questionnaire interface program 92 to be included within this disclosure.

Data information may be obtained, for example, but not meant as a limitation, by executing a query statement that is designed to return a record set containing information about the data in the current table. As another non-limiting example, a list of data could be obtained by using third-party provided data access classes, such as Microsoft's ADO.NET connection classes, to execute a provided method for retrieving the desired information. Desirable information about the data in a data table might include, as a non-limiting example, a list of the questionnaire page 84 names, along with their data types, or an indication of which questionnaire pages 84 are to be included in any data table index or foreign key, as understood by those skilled in the art. A skilled artisan, after having the benefit of this disclosure, would recognize that the steps in Blocks 305, 306, and 308 might be performed in any order, including without limitation, simultaneously.

Once the required data information has been retrieved in Block 308, it can be determined in Block 309 whether there is any data information in the current data table that has not been processed. If it is determined in Block 309 that there is no data information in the current table that have not been processed, it can be determined if there are any tables that have not been processed in Block 307. Otherwise, if it is determined in Block 309 that there is data information that has not been processed, appropriate member variables and methods can be added for the next available data information entry to the core class definition files for the current table in Block 311. It would be apparent to a person having skill in the art, after having the benefit of this disclosure, that the step in Block 311 may be optionally omitted based on the selections that have been made using the database configuration interface 260.

After member variables and methods have been added to the core class definition files for the current table in Block 311, the appropriate user interface elements may be added to the user interface files for the current table in Block 310, such that the data in the current column may be displayed and modified with the created content management system. It would be apparent to a person having skill in the art, after having the benefit of this disclosure, that the step in Block 310 may be optionally omitted based on the selections that have been made using the database configuration interface. Once the appropriate user interface elements have been added to the user interface files at Block 310, it can be determined again in Block 309 whether there is any data information in the current data table that have not been processed. A person having skill in the art, after having the benefit of this disclosure would recognize that the steps in Blocks 310 and 311 might be performed in any order, including without limitation, simultaneously.

Referring back to FIG. 4, after the questionnaire interface program 92 has been compiled and built during the compiling operation, represented by Block 270, the computer program product 10 may initiate the transfer operation, shown in Block 280. During the transfer operation 280, the newly created questionnaire interface program 92 and corresponding database 93 may be transferred to a server. Depending on the configuration chosen by the content designer through the database configuration interface 260, the questionnaire interface program 92 and/or database 93 may be hosted remotely or made available for download. Once, for example, the questionnaire interface program 92 is located on a hosting server, the questionnaire interface program 92 may be ready for access by the targeted client users and data collection may begin. A person of skill in the art will appreciate additional configuration and distribution operations within the scope and spirit of the present invention.

The following example of a specific client user performing the operations described in flowchart 200 will now be discussed. Skilled artisans will appreciate that the specific example is being provided in the interest of clarity, and should not view application of the present invention as limited to the following example. In the following example, the content designer may, for example, be USPTO Director Kappos, and a client user may be an aspiring patent attorney. The questionnaire interface program 92 built by the computer program product 10 may be the examination informally known as the patent bar.

Starting from Block 201 of FIG. 4, Kappos may access the computer program product 10, after which he may be presented a user login interface 59. Kappos may enter his credentials to at the user login interface 59 to access the site list interface 52 (Block 210). The site list interface 52 may include various questionnaire sites 82 that have previously been designed by Kappos, each of which may correspond to questionnaire interface program 92 other than the patent bar. Assuming Kappos desires to update the patent bar questionnaire site 82 to reflect the newly passed America Invents Act, he may select to design or edit patent bar questionnaire site 82 from the site list interface 52.

Since Kappos is editing the patent bar, he may not need to alter the design of the questionnaire site 82, since the resulting patent bar questionnaire interface program 92 will be of a fairly standard format and filled with text. Therefore, Kappos may quickly navigate through the site design interface at Block 220. However, Kappos may elect to designate that only candidates with the prerequisite background may be eligible to interface with the resulting patent bar questionnaire interface program 92 at Block 230.

Kappos may then be presented the page creation interface 54 at Block 250. Through the various interfaces included in the page creation interface 54, Kappos may be presented the question creation interface 252, answer creation interface 254, and answer validation interface 256 for each question to be included in the patent bar questionnaire interface program 92. Since the questions on the patent bar may be lengthy, Kappos may include a single question on multiple questionnaire pages 84. Additionally, since a number of questions may have been previously included in the questionnaire site 82, which may have been used to create a previous patent bar questionnaire interface program 92, Kappos may choose to only manipulate or edit one or more questionnaire pages 84, updating the questions included thereon to be relevant with the current law.

Once Kappos has completed designing or editing all the desired questionnaire pages 84, he may move to the database configuration interface of Block 260. Here, Kappos may designate that all responses entered by the aspiring patent attorney interacting with the revised patent bar questionnaire interface program 92 should be stored on a database 93 at the USTPO.

Once the database 93 has been designated, Kappos may instruct the computer program product 10 to build the patent bar questionnaire interface program 92 by initiating the compiling operation of Block 270. A database of client users 96 may additionally be created at Block 276 to include the information relating to the aspiring patent attorneys that may interface with the patent bar questionnaire interface program 92. A client user response database 98 may additionally be created to include the responses given to one or more questions presented to the aspiring patent attorney. Once the databases 93 have been built, the computer program product 10 may transfer the files from the database 93, including data tables, code, and other information used to build the patent bar questionnaire interface program 92, and the resulting patent bar questionnaire interface program 92 may be transferred to a server at Block 280.

After the patent bar questionnaire interface program 92 has been created, the operation may terminate at Block 290. Additionally, the questionnaire interface program 92 may now be ready to be presented to an aspiring patent attorney, which may use an interface in communication with the patent bar to take the examination. The patent bar questionnaire interface program 92 may then be electronically delivered to a testing center upon request.

The aspiring patent attorney may access the patent bar questionnaire interface program 92 though a computer user interface terminal 90 at a designated testing center. The aspiring patent attorney may then navigate through the voluminous questions of the patent bar, selecting the responses she believes to be correct for each question. The responses selected by the aspiring patent attorney may then be compared with the valid responses, the results of which may be stored in the database 93. After the aspiring patent attorney submits her responses for review, the patent bar questionnaire interface program may calculate the number of the client user selected responses that match the valid responses as it grades the exam. The patent bar questionnaire interface program may then inform the Kappos, and optionally the aspiring patent attorney, whether the aspiring patent attorney performed adequately in selecting her responses to the patent bar.

Figure 9:
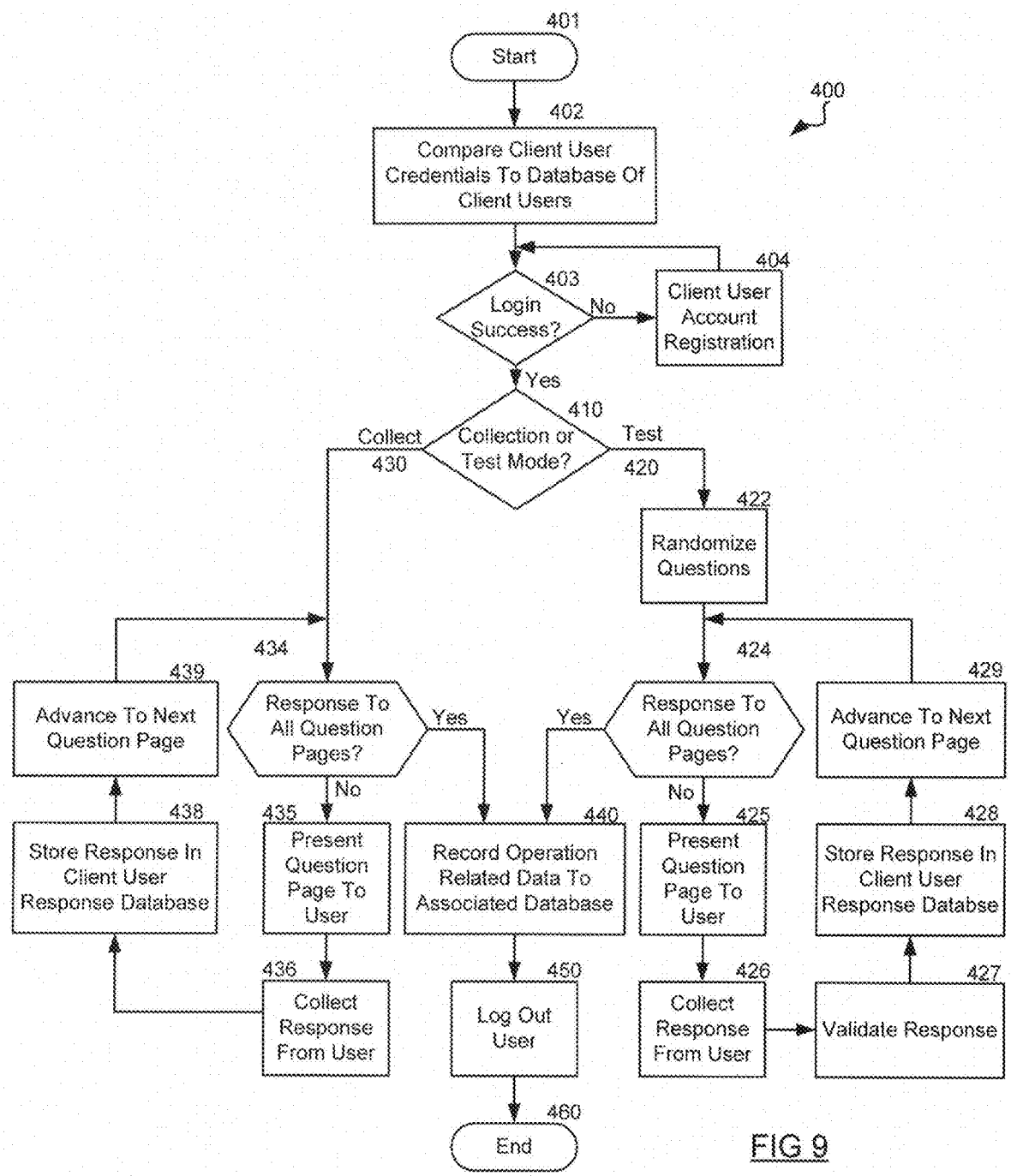
FIG. 9 is a flowchart illustrating operation of a built questionnaire interaction program for the computer program product according to an embodiment of present invention.

FIG. 9 illustrates a user interaction flowchart 400 describing, in one embodiment, the operation of a questionnaire interface program 92 built by the computer program product 10. A person of skill in the art will realize alternative program structures to present questionnaire pages 84, receive user responses, and record such responses to a database, while remaining within the spirit and scope of the present invention. Referring now to FIGS. 2-2A and 9, in an embodiment of the present invention, a client user may approach a user interface terminal 90 running an activated questionnaire interface program 92. After the client user initiates interaction with the user interface terminal 90 (Block 401), the client user may be prompted to log into his or her user account. The credentials of the client user may be compared to the database of client users 98 (Block 402). The questionnaire interface program 92 may then determine whether the client user's credentials are valid (Block 403).

If the client user does not have an account on record within the database of client users 98, the client user may be prompted to create an account (Block 404). Once a new user account has been created, the client user may again be prompted to log into his or her user account, at which time the questionnaire interface program 92 may again compare the credentials with the database of client users 98 (Block 402). After a successful user login to the questionnaire interface program 92, the program may determine whether the questionnaire interface program 92 is programmed to operate in testing mode 420 or collection mode 430 (Block 410).

If the questionnaire interface program 92 is configured to operate in testing mode 420, and if the content designer elects to allow randomization through the site design interface 220, the questionnaire interface program 92 may randomize the presentation order of the questionnaire pages 84 via a randomization algorithm known in the art, as represented by Block 422. A person of skill in the art will appreciate additional embodiments of the present invention, wherein the presentation of the questionnaire pages 84 may not be randomized, to be included within the scope and spirit of the present invention.

In testing mode 420, whether or not the questionnaire pages 84 have been randomized at Block 422, the questionnaire interface program 92 will check whether all questionnaire pages 84 in the database have been presented to the client user (Block 424). If at least one questionnaire page 84 remains, the questionnaire interface program 92 may present the remaining questionnaire page 84 to the client user and prompt the client user for a response to the question asked on the questionnaire page 84 (Block 426). The questionnaire interface program 92 may then collect a user response to the question presented on the questionnaire page 84.

Since the questionnaire interface program 92 is operating in testing mode, the questionnaire interface program 92 may validate the user generated response against a validation response generated by the content designer during the page creation interface (Block 427). The validation response may be stored in a database, such as the associated database 94. After a response from the client user has been collected and validated, the response from the client user may be entered into a database, such as the client user response database 94 (Block 428). The questionnaire interface program 92 may then advance to the next questionnaire page 84 (Block 429).

Likewise, if the questionnaire interface program 92 is configured to operate in collection mode 430, the questionnaire interface program 92 may also check whether all questionnaire pages 84 in the database have been presented to the user (Block 434). Similar to testing mode 420, if at least one questionnaire page 84 remains, the questionnaire interface program 92 may present the next questionnaire page 84 in sequence to the user and prompt for a response (Block 435). The questionnaire interface program 92 may also collect a response (Block 436), store the response to the client user response database (Block 438), and advance to the next questionnaire page 84 (Block 439). Unlike the testing mode 420, the collection mode 430 operation may exclude validating the responses submitted by users of the questionnaire interface program 92. After the questionnaire interface program 92 completes one question presentation, response, and storage cycle, the questionnaire interface program 92 may return to Block 434. If additional unanswered questionnaire pages 84 remain, the questionnaire interface program 92 may return to Block 435, present another questionnaire page 84, and repeat the previously described cycle.

Whether in testing mode 420 or collecting mode 430, if no unanswered questionnaire pages 84 remain, the questionnaire interface program 92 may record any additional data or information collected, regarding user interaction with the questionnaire interface program 92, to a database, such as the associated database 94 (Block 440). Once the data or information has been successfully recorded, the questionnaire interface program 92 may log the user out of the system (Block 450). Finally, as the questionnaire interface program 92 finishes (Block 460), the questionnaire interface program 92 may optionally return to the user registration interface (Block 401) and await interaction with the next user. In an additional embodiment of the present invention, user passwords may be encrypted using a standard encryption algorithm known in the art.

In yet another embodiment of the present invention, the operational status of the questionnaire interface program 92, built by the computer program product 10, may be selectable by the content designer. In this embodiment, an option may be presented for activating and deactivating each questionnaire site 82. The option may be presented, for example, in the site list interface 52. Here, the questionnaire site 82 may be selectively enabled via corresponding buttons. If the content designer engages an "activate" button, the corresponding questionnaire site 82 will be accessible to client users and actively record the responses and data input by such users. Conversely, if the content designer engages the "deactivate" button, the corresponding questionnaire site 82 will not be accessible by any client users and no responses or data will be collected or recorded.

In an alternate embodiment of the present invention, the questionnaire interface program 92 generated by the computer program product 10 may generate an electronic alert that may be transmitted or delivered to the content designer upon the occurrence of a predetermined or dynamically determined event. The alert may additionally be transmitted to a third party, transmitted to an electronic device, indicated generally, or otherwise be generated to be received by a person or device. A person of skill in the art will appreciate a multitude of electronic notifications capable of notifying a content designer, such as, but not limited to, e-mail, automated phone communication, SMS messaging, displaying a message on a monitor or screen, or other relevant electronic based notifications. An example of an event that may generate an alert may one or more response that is compliant with the valid responses, a response that has been flagged, a specified pattern, or another response that has otherwise been indicated to generate an alert by the content designer, a third party, or dynamically by the computer program product 10 according to an embodiment of the present invention.

In yet another embodiment of the present invention, the generated questionnaire interface program 92 may include additional security measures, such as, but not limited to, password security measures, data encryption, built in data validation, record keeping for each content generator, record keeping for each client user, and/or administrative overview and control.

In an additional embodiment of the present invention, once a content designer engages a "build" button, which may be provided in the form of a command button, as understood by those having skill in the art, a content designer may begin the process of creating a questionnaire interface program 92, having all of the characteristics that have been specified. After a content designer may engage the "build" button, a computer program product 10 may provide feedback to the user regarding the status of the questionnaire interface program 92 compilation process using a progress display. A person having skill in the art, after having the benefit of this disclosure, will appreciate that a progress display may be provided in the form of a graphical progress bar, which changes to indicate the percentage of a content management system creation process that has been completed. A progress display might include text prompts, which change to indicate the step of a content management system creation process that is currently executing.

The content designer may choose between the storing the compiled questionnaire interface program 92 on servers, downloading the questionnaire interface program 92 for hosting on servers managed by the content designer, or otherwise accessing the questionnaire interface program 92.

Additionally, after a user has successfully interacted with the questionnaire interface program 92, the questionnaire interface program 92 may generate reports on the data generated by a client user. Similarly, the questionnaire interface program 92 may generate reports that comprise the data from multiple user interactions with the questionnaire interface program 92. The reports generated may comprise raw data, analyzed data, graphical representations of the data, or other forms of data reports known to a skilled artisan.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

A person of skill in the art will appreciate that the preceding example has been described with detail in the interest of clearly describing an embodiment of the present invention. Skilled artisans will appreciate additional embodiments of the present invention, wherein the organization, interaction, and operation may include differences from the aforementioned example yet consistent with the scope and spirit of the present invention. As a result, skilled artisans would appreciate such differences are should not be excluded from the scope of the present invention. Many modifications and other embodiments of the present invention will come to the mind of one skilled in the art having the benefit of the teachings presented in the foregoing descriptions and the associated drawings. Therefore, it is understood that the invention is not to be limited to the specific embodiments disclosed.

That which is claimed is:

1. A computer program product embodied in a non-transitory computer-readable storage medium for creating a questionnaire interface program comprising:
   a database;
   a content designer interface to manipulate information in the database; and
   a compiler to create the questionnaire interface program using the information in the database;
   wherein the information in the database comprises:
      data tables,
      core files to define an operation of the questionnaire interface program, and
      core user interface files to define a user interface of the questionnaire interface program;
   wherein the content designer interface comprises a page creation interface configured to receive a questionnaire page that includes a question, and to store the questionnaire page to the data tables of the database;
   wherein the compiler is configured to use the data tables, the core files, and the core user interface files to create the questionnaire interface program; and
   wherein the questionnaire interface program is configured to display the questionnaire page and to receive a response to the question.

2. A computer program product according to claim 1 wherein the content designer interface further includes a user management interface to define permissions to control access to the questionnaire interface program.

3. A computer program product according to claim 2 wherein the information in the database comprises a client user account that includes the permissions to control access to the questionnaire interface program.

4. A computer program product according to claim 1 wherein a content designer account is included in the information in the database; and wherein the questionnaire page is associated with the content designer account.

5. A computer program product according to claim 1 wherein the content designer interface further includes an answer validation interface to define a valid response to the question; wherein the questionnaire interface program is configured to selectively validate the response to the question by comparing the response to the question to the valid response.

6. A computer program product according to claim 1 wherein the questionnaire interface program is configured to analyze at least one of the information included in the database and the response to the question, and to generate a report.

7. A computer program product according to claim 1 wherein the questionnaire interface program is stored on a server in data communication with a network and is configured to receive the response through the network.

8. A computer program product according to claim 1 wherein the user interface of the questionnaire interface program is further configured to operate the database to store the response to the question.

9. A computer program product according to claim 1 wherein the content designer interface includes a database configuration interface to define a remote database structure for a user database; and wherein the remote database structure defines the user database to include:
   an association to the information in the database,
   a registered username, and
   the response to the question.

10. A computer program product according to claim 1 wherein the content designer interface includes a database configuration interface to define a database structure for a user database; and wherein the database configuration interface is configured to selectively determine a code base to use to create the questionnaire interface program.

11. A computer program product according to claim 1 wherein the questionnaire interface program is configured to generate an alert upon an occurrence of an event; and wherein the alert is transmittable.

12. A method for creating a questionnaire interface program using a computer program product that comprises a database, a content designer interface that includes a page creation interface to manipulate information included in the database, and a compiler, the method comprising:
   receiving, using the content designer interface, a questionnaire page that includes a question;
   operating the database, using the content designer interface, to store the questionnaire page to data tables of the database; and
   creating the questionnaire interface program using the information in the database, wherein creating the questionnaire interface program comprises:
      copying core files from the database to a directory structure, the core files configured to define an operation of the questionnaire interface program;
      processing the data tables that include the information in the database to define the questionnaire page; and
      copying core user interface files from the database to the directory structure, the core user interface files configured to define a user interface of the questionnaire interface program; and
   operating the questionnaire interface program to display the questionnaire page and to receive a response to the question.

13. A method according to claim 12 wherein the content designer interface further includes a user management interface; and wherein the method further comprises receiving, using the user management interface, a client user account defining permissions to control access to the questionnaire interface program.

14. A method according to claim 12 wherein the content designer interface further includes an answer validation interface; and further comprising defining a valid response to the question using the answer validation interface, and selectively validating the response to the question by using the questionnaire interface program to compare the response to the question and the valid response.

15. A method according to claim 12 further comprising using the questionnaire interface program to:
   analyze at least one of the information included in the database and the response to the question, and
   generate a report.

16. A method according to claim 13 wherein the content designer interface includes a database configuration interface; and further comprising defining a remote database structure for a user database using the database configuration interface; wherein the remote database structure defines the user database to include:
   an association to the information in the database used to generate the questionnaire interface program,
   the client user account including a registered username, and
   the response to the question.

17. A method according to claim 12 wherein the content designer interface includes a database configuration interface; and further comprising:

defining a database structure for the database using the database configuration interface, and selectively determining a code base to use to create the questionnaire interface program.

18. A method for creating a questionnaire interface program using a computer program product comprising a database and a content designer interface comprising a site list interface, a page creation interface, and an answer validation interface; the method comprising:

manipulating information included in the database using the content designer interface by:

defining the information used to build the questionnaire interface program, wherein defining the information further includes the steps of:

using the site list interface to design a questionnaire site that includes a questionnaire page, using the page creation interface to design the questionnaire page that includes a question, using the answer validation interface to define a valid response to the question, and configuring the database to include a client user account that includes permissions to control access to the questionnaire interface program; and operating the questionnaire interface program by:

displaying the questionnaire page, receiving a response to the question, storing the response to at least one of the database and a user database, selectively validating the response to the question by comparing the response to the question to the valid response, analyzing at least one of the information included in the database and the response to the question, and generating a report.

19. A method according to claim 18 wherein creating the questionnaire interface program from the information in the database further includes the steps of:

copying core files to a directory structure, the core files configured to define an operation of the questionnaire interface program;

processing data tables that include the information in the database to define the questionnaire site and the questionnaire page;

copying core user interface files from the database to the directory structure, the core user interface files configured to define a user interface of the questionnaire interface program.

20. A method according to claim 18 wherein the content designer interface includes a database configuration interface to define a remote database structure for a user database; and wherein the remote database structure defines the user database to include:

a registered username, and the response to the question.

21. A method according to claim 18 wherein the content designer interface includes a database configuration interface to define a database structure for a user database; and further comprising selectively determining a code base used to create the questionnaire interface program using the database configuration interface.

\* \* \* \* \*